United States Patent [19]

Rimsa et al.

[11] Patent Number: 5,656,682

[45] Date of Patent: Aug. 12, 1997

[54] POLYMER COMPOSITION COMPRISING ESTERIFIED STARCH AND ESTERIFIED CELLULOSE

[75] Inventors: Stephen Rimsa, Lebanon; Paul Tatarka, Randolph, both of N.J.

[73] Assignee: National Starch and Chemical Investment Holding Corporation, Wilmington, Del.

[21] Appl. No.: 156,528

[22] Filed: Nov. 19, 1993

Related U.S. Application Data

[63] Continuation of Ser. No. 948,538, Sep. 22, 1992, abandoned, which is a continuation-in-part of Ser. No. 895,473, Jun. 8, 1992, abandoned.

[51] Int. Cl.$^6$ .............................. C08L 1/10; C08L 1/12; C08L 3/06; C08K 5/00
[52] U.S. Cl. .................. 524/37; 524/38; 524/39; 524/40; 524/41; 524/51; 524/52; 524/53; 524/47; 524/908; 525/54.3; 525/54.31; 525/54.24; 525/54.26
[58] Field of Search ................... 536/110, 124; 524/35, 52, 37, 38, 39, 41, 51, 53, 40, 908, 9, 13, 47; 106/169, 210; 525/54.3, 54.31, 54.24, 54.26

[56] References Cited

U.S. PATENT DOCUMENTS

| | | | |
|---|---|---|---|
| 2,092,677 | 9/1937 | Lovett | 106/162.7 |
| 2,412,213 | 12/1946 | Groen | 536/110 |
| 2,805,171 | 9/1957 | Williams | 106/176 |
| 3,329,509 | 7/1967 | Julius | 523/100 |
| 4,263,183 | 4/1981 | Light et al. | 524/40 |
| 4,673,438 | 6/1987 | Wittwer et al. | 106/126 |
| 4,738,724 | 4/1988 | Wittwer et al. | 106/213 |
| 4,900,361 | 2/1990 | Sachetto et al. | 106/213 |
| 5,095,054 | 3/1992 | Lay et al. | 524/47 |
| 5,205,863 | 4/1993 | Elion | 106/154.1 |
| 5,280,055 | 1/1994 | Tomka | 524/47 |
| 5,288,318 | 2/1994 | Mayer et al. | 106/213 |
| 5,446,140 | 8/1995 | Maheras et al. | 536/123 |

OTHER PUBLICATIONS

Ott, Cellulose and Cellulose Derivatives, pp. 684–695, 1943 (Month Unavailable).

Motozato, Translation of Japanese Patent 54–55055, (May 1979).

Mullen, II et al. "Starch Studies Possible Industrial Utilization of Starch Esters", Industrial and Engineering Chemistry, 35, No. 3, pp. 381–384 (1943).

Wolff et al. "Mixed Esters of Amylose", Industrial and Engineering Chemistry, 49, No. 8, Aug. 1957, pp. 1247–1248.

*Primary Examiner*—Jeffrey C. Mullis
*Attorney, Agent, or Firm*—Eugene Zagarella, Jr.

[57] ABSTRACT

According to the present invention there is provided a composition as obtained from a melt comprising a starch ester and a cellulose ester. The starch ester and cellulose ester may be of the kind obtained by reaction of a mixed acid anhydride with the polysaccharides. The invention further provides the composition when shaped into articles, and the melt from which the composition is obtained.

27 Claims, No Drawings

POLYMER COMPOSITION COMPRISING ESTERIFIED STARCH AND ESTERIFIED CELLULOSE

This is a continuation of application Ser. No. 07/948,538 filed on Sep. 22, 1992, now abandoned, which is a continuation-in-part of application Ser. No. 07/895,473, filed on Jun. 8, 1992, now abandoned.

FIELD OF THE INVENTION

The present invention relates to degradable polymer compositions capable of being formed by heat and pressure into articles having good dimensional stability and physical properties. These compositions comprise a starch ester and a cellulose ester.

BACKGROUND OF THE INVENTION

Modern life is tremendously enhanced by thermoplastic polymeric materials. There is almost no human endeavour that is not touched by these extremely useful compounds. They can be made into tough, durable products that enhance human health and well-being and are, for the most part, extremely resistant to wear and weathering. Unfortunately, the very qualities of resistance to wear and weathering make these materials very difficult to dispose of. In addition, most common thermoplastic materials are derived from petroleum, a non-renewable resource. Extraction and refinement of petroleum also entails risks of pollution.

One solution to the problems posed by conventional thermoplastic polymeric materials is the use of a renewable source of polymer such as the starch found in many vegetable products. This starch may be treated at elevated temperatures and pressures to form a melt, as set out in U.S. Pat. No. 4,673,438 to Wittwer et al., issued Jun. 16, 1987, U.S. Pat. No. 4,738,724 to Wittwer et al., issued Apr. 19, 1988, U.S. Pat. No. 4,900,361 to Sachetto et al., issued Feb. 13, 1990, and U.S. Pat. No. 5,095,054 to Lay et al., issued Mar. 10, 1992.

Such starch melts provide articles having excellent properties for a wide range of uses, are rapidly biodegradable, and are obtainable from annually renewable resources.

The term "biodegradable" is not well defined in the art. Some thermoplastic materials which merely disassemble into smaller, albeit non-biodegradable, thermoplastic pieces over time have been called "biodegradable". A "biodegradable" material is properly defined as one that "mineralizes" at approximately the same rate as soil organics, leaving no synthetic, hazardous or toxic residues.

"Mineralization" is the metabolic conversion of organic compounds to naturally occurring gases, biomass and inorganic constituents.

A "compostable" material is a biodegradable material that breaks down to become humus, with mineralization initiated during the composting process and completed during the end use of the humus, at a rate similar to natural soil organics, leaving no synthetic, hazardous or toxic substances.

Unfortunately, starch melts per se are not always suitable for all purposes. Often it is desirable to add other polymers to form a blend or mixture with the starch melt to enhance some desired property. Some such polymers per se are not always biodegradable.

Accordingly, there is a strong need in the art for thermoplastic polymeric mixtures and blends that are fully biodegradable. Preferably, such thermoplastic polymeric materials should be entirely derived from renewable, natural resources.

Moreover, starch-based shaped articles may exhibit the disadvantages of relatively poor physical properties under high relative humidity conditions and a relatively high tendency to embrittlement under relatively low humidity conditions.

Attempts to overcome these humidity-related problems by the replacement of the above mentioned starch by maize starch esters having a low degree of substitution, as commonly found in the starch industry, have generally been unsuccessful, often resulting in weak, brittle, hydrophilic materials having a poor balance of physical properties.

It is an object of the present invention to overcome, at least in part, the above mentioned disadvantages.

SUMMARY OF THE INVENTION

According to the present invention there is provided a composition as obtained from a melt comprising a starch ester and a cellulose ester.

The esterified starch may be selected from the group consisting $C_2$ to $C_{22}$-starch esters and more preferably from the group consisting of starch acetates, starch propionates, starch butyrates, starch pentanoates, and starch hexanoates, and mixtures thereof.

The starch ester may be a mixed ester, i.e. having different kinds of ester groups attached to the same molecule, as are obtained, for example, by reaction of starch with a mixed acid anhydride or a mixture of different acid anhydrides. Such a mixed acid anhydride may be, for example, an acid anhydride made from acetic acid and propionic acid; a mixture of different acid anhydrides may be, for example, a mixture of acetic acid anhydride and propionic acid anhydride.

The esterified starch as used in this invention may be made from a starch as obtained from potatoes, rice, tapioca, corn, pea, rye, oats, and wheat with the respective known amylose content. However, the amylose content of the starch is preferably at least about 50% by weight with respect to that of the starch.

The esterified cellulose present in the composition according to this invention may be selected from the group consisting of $C_2$ to $C_{22}$ cellulose esters and more preferably is selected from the group consisting of cellulose acetates, cellulose propionates, cellulose butyrates, cellulose pentanoates, and cellulose hexanoates, and mixtures thereof.

The cellulose ester may have been obtained by reaction of cellulose with a mixed acid anhydride or with a mixture of different acid anhydrides.

The composition may further include one or more members selected from the group consisting of extenders; fillers; wood derived materials; oxides of magnesium, aluminum, silicon, and titanium; lubricants; mold release agents; plasticisers; stabilisers; colouring agents; flame retardants; boron-containing compounds; alkali and alkaline earth metal salts; thermal stabilisers; and melt flow accelerators; and mixtures thereof.

The composition may further include at least one hydrophobic thermoplastic polymer which is substantially water-insoluble.

The invention further provides the composition according to this invention when shaped into articles, for example bottles, strands, sheets, films, packaging materials, pipes, cups, rods, laminated films, sacks, bags, pharmaceutical capsules, foams, granulates and powders by a process including injection molding, compression molding, filming, blow molding, vacuum forming, thermoforming, extrusion, extrusion moulding, co-extrusion, foaming, profile extrusion and combinations thereof.

The invention still further provides the composition of the present invention in the form of a melt.

The invention still further provides a process for forming said melt comprising-heating a starch ester and a cellulose ester, optionally in the presence of a plasticiser, to an elevated temperature and plastifying the thus heated composition until a uniform melt is obtained.

The present invention still further provides the use of a cellulose ester as a thermoplastic component in a composition as obtained from a melt comprising a starch ester.

The present invention will be further apparent from the following description taken in conjunction with the accompanying examples and appended claims.

DETAILED DESCRIPTION OF THE INVENTION

The present invention provides a composition as obtained from a melt comprising a starch ester and a cellulose ester.

The esterified starch is selected from the group consisting of $C_2$ to $C_{22}$ starch esters and preferably is a $C_2$ to $C_8$ starch esters. It is particularly preferred that the esterified starch is a starch acetate, starch propionate, starch butyrate, starch pentanoate, and/or a starch hexanoate, and/or a mixture thereof. Most particularly preferred are the esters having more than 2-carbon atoms in the alkylcarbonyl residue.

The starch ester may be a mixed ester comprising at least two different types of alkylcarbonyl groups (i.e. of different lengths) in the same molecule and as such may be of the kind as obtained by reaction of starch with a mixed anhydride or with a mixture of different acid anhydrides.

It is most preferred that such mixed starch esters comprise at least two members selected from the group consisting of acetate, propionate, butyrate, pentanoate, hexanoate, heptanoate and octanoate residues bound to the same molecule.

Particularly preferred starch diesters comprise both acetate and propionate groups or both acetate and butyrate groups or both propionate and butyrate groups or both pentanoate and butyrate groups bound to the same molecule.

In the case of starch diesters, the ratio of the types of ester groups comprised by the starch ester may vary greatly, but preferably is in the range of about 1:1 to about 1:20.

The degree of the total substitution of the esterified starch is from about 1.5 to about 2.9, and it is more preferred that the degree of substitution is from about 1.8 to about 2.9, independent of the type of substitution. The most preferred degree of substitution is from about 1.8 to about 2.5.

Examples of starch esters are given in Table 1.

TABLE 1

| Example No. | starch type | ester type | degree of substitution |
|---|---|---|---|
| 1. | corn | acetate | 1.75 |
| 2. | corn | acetate | 2.58 |
| 3. | corn | propionate | 1.84 |
| 4. | corn | propionate | 2.47 |
| 5. | Hylon VII* | acetate | 1.83 |
| 6. | Hylon VII* | acetate | 2.35 |
| 7. | Hylon VII* | acetate | 2.81 |
| 8. | Hylon VII* | propionate | 1.89 |
| 9. | Hylon VII* | propionate | 2.55 |

*Hylon VII is a high amylose corn starch with an amylose content of about 70%, sold by National Starch and Chemical Co, USA.

Examples of mixed starch esters are given in Table 2.

TABLE 2

| Ex. Nr. | starch type | amylose content | ester type (1) | ester type (2) | ratio ester 1 : ester 2 | total DS* |
|---|---|---|---|---|---|---|
| 10. | corn | 27% | acetate | pro'ate | 25:75 | 2.36 |
| 11. | corn | 27% | acetate | pro'ate | 50:50 | 1.85 |
| 12. | corn | 27% | acetate | pro'ate | 75:25 | 1.60 |
| 13. | corn | 27% | acetate | pro'ate | 05:95 | 1.82 |
| 14. | corn | 27% | acetate | but'ate | 40:60 | 2.05 |
| 15. | corn | 27% | acetate | but'ate | 95:05 | 2.59 |
| 16. | corn** | 70% | acetate | pro'ate | 25:75 | 2.06 |
| 17. | corn** | 70% | acetate | pro'ate | 50:50 | 1.84 |
| 18. | corn** | 70% | acetate | pro'ate | 75:25 | 1.77 |
| 19. | corn** | 70% | acetate | but'ate | 05:95 | 1.87 |
| 20. | corn** | 70% | acetate | but'ate | 40:60 | 2.06 |
| 21. | corn** | 70% | acetate | but'ate | 95:05 | 2.73 |

* = degree of substitution
pro'ate = propionate
corn** = Hylon VII
but'rate = butyrate Within the scope of this invention, any type of commercially available starch to produce the esterified starch may be used such as native starch selected from potatoes, rice, tapioca, corn, pea, rye, oats, and wheat. Starches which have a reduced molecular weight by virtue of their being thermomechanically or chemically cleaved are also suitable for use according to the present invention. It is preferred that the amylose content of any such suitable starch is at least about 50% and preferably is higher than this, typically being in excess of about 70% by weight with respect to that of the starch.

A highly suitable starch is the high amylose genetically modified corn starch, Hylon VII, having an amylose content of about 75%, available from National Starch and Chemical Company of Finderne Avenue, Bridgewater, N.J. 08807, U.S.A. Such starch is subsequently esterified, e.g. acetylated or propionated to a degree of substitution of at least 1.5. and preferably 1.8.

A particularly suitable esterified high amylose starch is Hylon VII acetylated or propionated, preferably propionated, to a degree of 2.3.

The cellulose esters present in the composition of the present invention are selected from the group consisting of $C_2$ to $C_{22}$ cellulose esters and more preferably are selected from the group consisting of $C_2$ to $C_8$ cellulose esters.

Such preferred cellulose esters include cellulose acetates, cellulose propionates, cellulose butyrates, cellulose pentanoates, and cellulose hexanoates, and mixtures thereof.

The cellulose ester may have been obtained by reaction of cellulose with a mixed acid anhydride or with a mixture of different acid anhydrides, analogously as described above for the starch esters.

Preferred such mixed cellulose esters comprise at least two members selected from the group consisting of acetate, propionate, butyrate, pentanoate, hexanoate, heptanoate and octanoate, and are, for example, comprise both acetate and propionate groups bound to a common cellulose molecule, or both acetate and butyrate groups bound to a common cellulose molecule, or both propionate and butyrate groups bound to a common cellulose molecule, or both pentanoate and butyrate groups bound to a common cellulose molecule.

The ratio of the substituents in the mixed cellulose esters varies greatly but in the case of diesters varies typically from 1:1 to 1:20.

The degree of substitution of the cellulose esters varies greatly but is typically from about 1.5 to about 2.9, more preferably from about 1.8 to about 2.9, and most preferably is from about 1.8 to about 2.5.

Examples of cellulose esters are given in Table 3.

TABLE 3

| Example | Ester type | Degree of substitution |
|---------|------------|------------------------|
| 22.     | acetate    | 1.85                   |
| 23.     | acetate    | 2.00                   |
| 24.     | acetate    | 2.45                   |
| 25.     | acetate    | 2.50                   |
| 26.     | acetate    | 2.80                   |

Examples of mixed cellulose esters are given in Table 4.

TABLE 4

| Example | Ester type (1) | Ester type (2) | Ratio ester 1:2 in % b.w. |
|---------|----------------|----------------|---------------------------|
| 27.     | acetate        | propionate     | 0.5:43                    |
| 28.     | acetate        | propionate     | 1.0:43                    |
| 29.     | acetate        | propionate     | 2.5:45                    |
| 30.     | acetate        | butyrate       | 2.0:48                    |
| 31.     | acetate        | butyrate       | 12:37                     |
| 32.     | acetate        | butyrate       | 28:16                     |

* = degree of substitution

Cellulose esters may be obtained from Hoechst Celanese and under the Tradename Tenite from Eastman Kodak, U.S.A.

Whilst the substituted high amylose starches present in the inventive compositions are thermoplastic per se, i.e. in the absence of an added plasticiser, the composition comprising the cellulose esters may advantageously further comprise a plasticiser by which the melting temperature of the composition may be reduced and the processability thereof improved.

The plasticiser is selected from plasticisers known per se, including glycerol triacetate(triacetin), dimethyl phthalate, diethyl phthalate, dibutyl phthalate, dihexyl phthalate, di-2-ethylhexyl phthalate, di-n-octyl phthalate, di-isooctyl phthalate, di-isonyl phthalate, di-isodecyl phthalate, dicyclohexylphthalate, dimethylcyclhexyl phthalate, dimethylglycol phthalate, trichloroethyl phosphate, cresyl diphenyl phosphate, triphenyl phosphate, tri-cresyl phosphate, triacetyl citrate, triethyl acetyl citrate, triethylene glycol di(2-ethylbutyrate), diacetin, butyl phthalylbutyl glycolate, acetylated monoglycerides, triethyl citrate, diethyl succinate, dimethyl sebacate, tributyl phosphate, di-n-hexyl azelate, di-isooctyl azelate, di-(2-ethyl-hexyl) azelate, dicapryl adipate, n-ethyl-o,p-toluene sulfonamide diethylene glycole dibenzoate, dipropylene glycole dibenzoate and mixtures thereof.

The most preferred plasticiser is glycerol triacetate, dimethyl sebecate, diethyl succinate, acetyl triethyl citrate, diethyl phthalate or mixtures thereof which may be present in the composition in an amount of from about 5 to about 45% by weight with respect to that of the composition.

The composition may further contain extenders; fillers; wood derived materials; oxides of magnesium, aluminum, silicon, and titanium; lubricants; mold release agents; plasticisers; stabilisers; colouring agents; flame retardants; boron-containing compounds; alkali and alkaline earth metal salts; thermal stabilisers; and melt flow accelerators; and. mixtures thereof.

The preferred thermal stabiliser and mold release agent are respectively butylated hydroxy toluene and stearyl stearamide which may be present in the composition in amounts respectively of from about 0.01 to about 5% and from about 0.01 to about 2%, by weight with respect to the starch ester component of the composition.

In one embodiment of the invention, the composition further comprises a native or chemically modified (non esterified) starch selected from potatoes, rice, tapioca, corn, pea, rye, oats, and wheat.

Further embodiments of the invention include compositions which comprise, preferably in an amount of up to 40% by weight of the total composition, one or more compounds selected from the group of water-soluble and/or water-swellable polymers.

Such water-soluble and/or water-swellable polymers include alkenol copolymers which contain vinyl alcohol units as well as aliphatic units such as are obtained by copolymerization of vinyl acetate with a member selected from ethylene, propylene, isobutylene and/or styrene with subsequent hydrolysis of the vinyl ester group, whereby the hydroxyl group content is such that the copolymerized polymer is at least water-swellable.

Still further embodiments of the invention include compositions which comprise, preferably in an amount of up to 60% by weight of the total composition, one or more hydrophobic thermoplastic polymer(s) which is/are substantially water-insoluble.

Said hydrophobic polymer preferably contains a member selected from the group consisting of: hydroxyl-, ether-, acid-, ester- and urethane groups, and mixtures thereof and includes ethylene/vinyl acetate-copolymers, ethylene/vinyl alcohol-copolymers, ethylene/acrylic acid-copolymers, ethylene/ethyl acrylate-copolymers, ethylene/methacrylate-copolymers, polyurethane-copolymers, styrene/acrylonitrile-copolymers; polyacetals and mixtures thereof.

It is particularly preferred that the hydrophobic polymer is selected from the group consisting of ethylene/vinyl alcohol-copolymers with an ethylene content of about 10 mol % to about 50 mol %.

A method of preparing the melt from which the present inventive composition is obtained comprises heating at least one starch ester and at least one cellulose ester, optionally in the presence of a plasticiser to an elevated temperature and plastifying the thus heated composition until a uniform melt is obtained.

The invention will be further apparent from the following Examples.

EXAMPLES

A series of injection molded test samples were made using a Hylon VII corn starch acetate with a degree of substitution of 2.35 according to Table 1, Example 6. The Hylon VII was blended with the cellulose acetate according to Table 3, Example 23 in different ratios. Measurements were made of the equilibrium water content, the Young's modulus and tensile strength (various properties at 10% relative humidity, 50% relative humidity, and 90% relative humidity). The surprising superiority of the blends to the non-blended starch material in set out below.

EXAMPLE 1

| Formulation 1: | |
|---|---|
| Hylon VII acetate, DS 2.35 (Table 1, Example 6) | 769 parts |
| Triacetin | 231 parts |
| BHT | 5 parts |
| Kemamide S-180 | 3 parts |
| Formulation 2: | |
| Hylon VII acetate, DS 2.35 | 700 parts |
| cellulose acetate, DS 2.00 (Table 3, Example 23) | 100 parts |
| Triacetin | 200 parts |
| BHT | 5 parts |
| Kemamide S-180 | 3 parts |

| Results: | Formulation 1 | Formulation 2 |
|---|---|---|
| 10% relative humidity: | | |
| water content (%) | 0.4 | 0.4 |
| Young's modulus (psi) | 242'900 | 401'200 |
| stress at break (psi) | 3'226 | 3'824 |
| 50% relative humidity: | | |
| water content (%) | 1.6 | 1.7 |
| Young's modulus (psi) | 206'100 | 350'600 |
| stress at break (psi) | 2'006 | 3'293 |
| 90% relative humidity: | | |
| water content (%) | 5.0 | 5.5 |
| Young's modulus (psi) | 27'330 | 228'800 |
| stress at break (psi) | 323 | 1659 |

EXAMPLE 2

| Formulation 3: | |
|---|---|
| Hylon VII acetate, DS 2.35 | 550 " |
| cellulose acetate, DS 2.00 (Table 3, Example 23) | 250 " |
| Triacetin | 200 " |
| BHT | 5 " |
| Kemamide S-180 | 3 " |
| Formulation 4: | |
| Hylon VII acetate, DS 2.35 | 350 " |
| cellulose acetate, DS 2.00 (Table 3, Example 23) | 400 " |
| Triacetin | 250 " |
| BHT | 5 " |
| Kemamide S-180 | 3 " |

| Results: | Formulation 3 | Formulation 4 |
|---|---|---|
| 10% relative humidity: | | |
| water content (%) | 0.6 | 0.5 |
| Young's modulus (psi) | 497'000 | 379'600 |
| stress at break (psi) | 4854 | 5347 |
| 50% relative humidity: | | |
| water content (%) | 2.1 | 1.8 |
| Young's modulus (psi) | 417'300 | 427'700 |
| stress at break (psi) | 4'117 | 5'996 |
| 90% relative humidity: | | |
| water content (%) | 5.8 | 5.9 |
| Young's modulus (psi) | 294'400 | 231'800 |
| stress at break (psi) | 2095 | 2592 |

Similar results are obtained when using a corn starch ester together with a cellulose ester, e.g. by replacing the Hylon VII ester of the Examples by an analogously substituted corn starch ester. Similar results were obtained when a Hylon VII acetate with a degree of substitution of 2.00 was used.

The results show that already a relatively small amount of cellulose ester blended with the starch ester improves considerably the properties of the blended material showing a surprising synergistic effect.

The above Examples demonstrate the extrusion and injection mouldability of the present inventive compositions, which may be shaped into articles such as bottles, strands, sheets, films, packaging materials, pipes, cups, rods, laminated films, sacks, bags, pharmaceutical capsules, foams, granulates and powders by processes which include injection molding, compression molding, filming, blow molding, vacuum forming, thermoforming, extrusion, extrusion moulding, co-extrusion, foaming, profile extrusion and combinations thereof.

It will be appreciated that it is not intended to limit the invention to the above examples only, many variations thereto and modifications thereof being possible to one skilled in the art without departing from scope of the invention, which is defined by the appended claims.

What we claim is:

1. A composition obtained from a melt consisting essentially of a starch ester and a cellulose ester, wherein
   the starch ester has a degree of substitution of from 1.5 to 2.5 and is selected from the group consisting of $C_2$ to $C_{22}$ starch esters, and
   the cellulose ester has a degree of substitution of from 1.5 to 2.5 and is selected from the group consisting of $C_2$ to $C_{22}$ cellulose esters.

2. A composition according to claim 1, in which the esterified starch is selected from the group consisting of $C_2$ to $C_8$ starch esters.

3. A composition according to claim 1, in which the starch ester has more than 2 carbon atoms in its alkyl-carbonyl residue.

4. A composition according to claim 1, wherein the starch ester has been obtained by reaction of starch with a mixed acid anhydride or with a mixture of different acid anhydrides.

5. A composition according to claim 1, wherein the starch ester comprises at least two different ester groups bound to a common starch molecule, said ester groups selected from the group consisting of acetate, propionate, butyrate, pentanoate, hexanoate, heptanoate and octanoate.

6. A composition according to claim 5, wherein the starch ester is selected from the group consisting of starch esters having both acetate and propionate groups bound to a common starch molecule, both acetate and butyrate groups bound to a common starch molecule, and both propionate and butyrate groups bound to a common starch molecule, and both pentanoate and butyrate groups bound to a common starch molecule.

7. A composition according to any one of claims 4 to 6, in which the ratio of the ester groups is about 1:1 to 1:20.

8. A composition according to claim 1, in which the degree of substitution of the starch ester is from about 1.8 to about 2.5.

9. A composition according to claim 1, the amylose content of the starch ester is at least about 50%.

10. A composition according to claim 1, in which the esterified cellulose is selected from the group consisting of cellulose acetates, cellulose propionates, cellulose butyrates, cellulose pentanoates, and cellulose hexanoates, and mixtures thereof.

11. A composition according to claim 1, in which the cellulose ester has more than 2 carbon atoms in its alkyl-carbonyl residue.

12. A composition according to claim 1, in which the cellulose ester been obtained by reaction of cellulose with a mixed acid anhydride or with a mixture of different acid anhydrides.

13. A composition according to claim 12, wherein the cellulose ester comprises at least two different ester groups bound to a common cellulose molecule selected from the group consisting of acetate, propionate, butyrate, pentanoate, hexanoate, heptanoate and octanoate.

14. A composition according to claim 13, wherein the cellulose ester contains ester groups selected from the group consisting of cellulose esters having both acetate and propionate groups bound to a common cellulose molecule, both acetate and butyrate groups bound to a common cellulose molecule, both propionate and butyrate groups bound to a common cellulose molecule, and both pentanoate and butyrate groups bound to a common cellulose molecule.

15. A composition according to any one of claims 12 to 14, in which the ratio of the cellulose ester groups is about 1:1 to 1:20.

16. A composition according to claim 1, in which the degree of substitution of the cellulose ester is from about 1.8 to about 2.5.

17. A composition according to claim 1, further comprising a member selected from the group consisting of extenders; fillers; wood derived materials; oxides of magnesium, aluminum, silicon, and titanium; lubricants; mold release agents; plasticizers; stabilizers; coloring agents; flame retardants; boron-containing compounds; alkali and alkaline earth metal salts; thermal stabilizers; melt flow accelerators; and mixtures thereof.

18. A composition according to claim 1, wherein a plasticizer is present in an amount of from about 5 to about 45% by weight of the composition and is selected from the group consisting of glycerol, glycerol triacetate (triacetin), dimethyl phthalate, diethyl phthalate, dibutyl phthalate, dihexyl phthalate, di-2-ethylhexyl phthalate, di-n-octyl phthalate, di-isooctyl phthalate, di-isononyl phthalate, di-isodecyl phthalate, dicyclohexylphthalate, dimethylglycol phthalate, trichloroethyl phosphate, cresyl diphenyl phosphate, triphenyl phosphate, tri-cresyl phosphate, triacetyl citrate, triethyl acetyl citrate, triethylene glycol di(2-ethylbutyrate), diacetin, butyl phthalylbutyl glycolate acetylated monoglycerides, triethyl citrate, diethyl succinate, dimethyl sebacate, tributyl phosphate, di-n-hexyl azelate, di-isooctyl azelate, di-(2-ethylhexyl) azelate, dicapryl adipate, n-ethyl-o,p-toluene sulfonamide diethylene glycole dibenzoate dipropylene glycol dibenzoate and mixtures thereof.

19. A composition according to claim 1, wherein a thermal stabilizer and mold release agent are present in the composition in amounts respectively of from about 0.01 to about 5% and from about 0.01 to about 2%, by weight with respect to the starch ester component of the composition.

20. The composition of claim 1, shaped into articles.

21. An article according to claim 20 selected from the group consisting of bottles, strands, sheets, films, packaging materials, pipes, cups, rods, laminated films, sacks, bags, pharmaceutical capsules, foams, granulates and powders.

22. An article according to claim 21 shaped by a process selected from the group consisting of injection molding, compression molding, filming, blow molding, vacuum forming, thermoforming, extrusion, extrusion molding, co-extrusion, foaming, profile extrusion and combinations thereof.

23. A composition according to claim 1 in which the esterified cellulose is selected from the group consisting of $C_2$ to $C_8$ cellulose esters.

24. A composition according to claim 1, further comprising a native, granular or chemically modified (non-esterified) starch selected from potatoes, rice, tapioca, corn, pea, rye, oats or wheat.

25. A composition according to claim 1, further comprising, in an amount up to about 60% by weight of the total composition, one or more hydrophobic thermoplastic polymers which are substantially water-insoluble and wherein the polymer is selected from the group consisting of ethylene/vinyl alcohol-copolymers with an ethylene content of from about 10 to 50 mole %.

26. A composition according to claim 1 in the form of a melt.

27. A process for forming the melt of claim 26 comprising the steps of heating a starch ester which has a degree of substitution within the range of from 1.5 to 2.9 and is selected from the group consisting of starch acetates, starch propionates, starch butyrates, starch pentanoates, and starch hexanoates; and a cellulose ester which has a degree of substitution within the range of from 1.5 to 2.5 and is selected from the group consisting of cellulose acetates, cellulose propionates, cellulose butyrates, cellulose pentanoates, and cellulose hexanoates, optionally in the presence of a plasticizer above the melting points of the starch ester and the cellulose ester and plastifying the heated composition until a uniform melt is obtained.

* * * * *